K. IKEDA.
PROCESS OF MANUFACTURING HYDROGEN SULFID.
APPLICATION FILED NOV. 12, 1917.
1,351,755.
Patented Sept. 7, 1920.
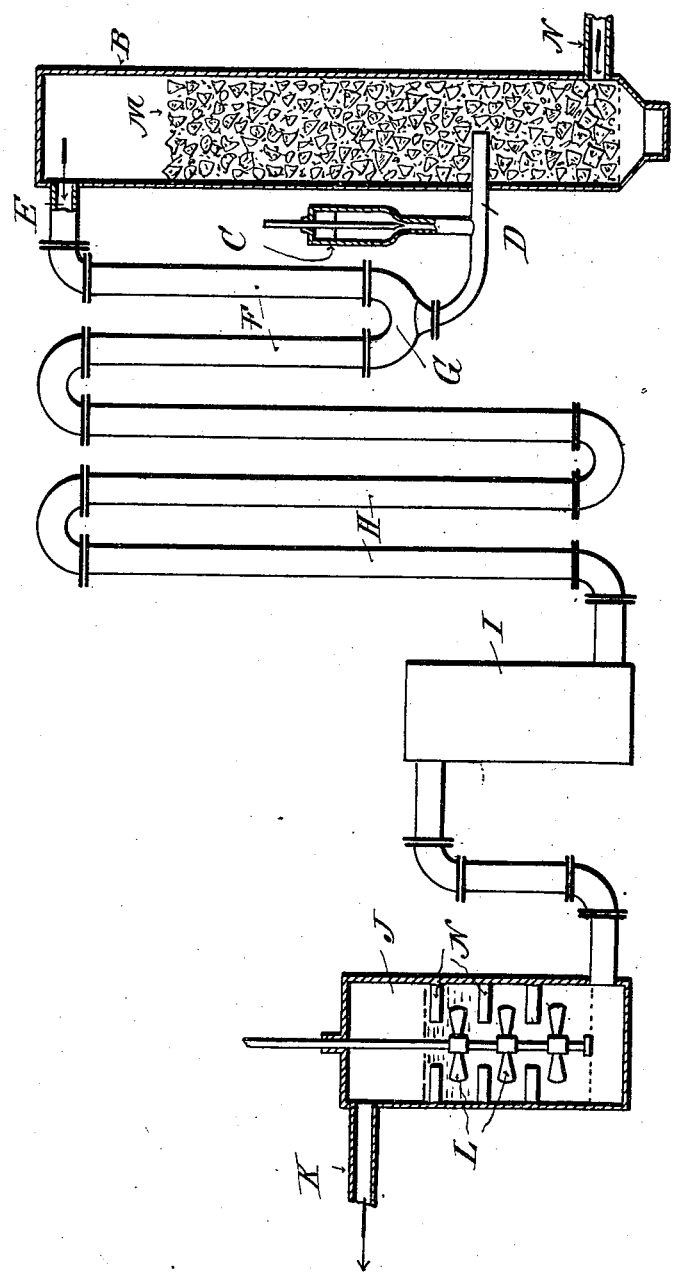
Inventor
Kikunaë Ikeda
by his atty Samuel S. Darby

UNITED STATES PATENT OFFICE.

KIKUNAË IKEDA, OF TOKYO, JAPAN.

PROCESS OF MANUFACTURING HYDROGEN SULFID.

1,351,755.  Specification of Letters Patent.  Patented Sept. 7, 1920.

Application filed November 12, 1917. Serial No. 201,666.

*To all whom it may concern:*

Be it known that I, KIKUNAË IKEDA, a subject of the Emperor of Japan, residing at Tokyo, Japan, have made a certain new and useful Invention in Processes of Manufacturing Hydrogen Sulfid, of which the following is a specification.

This invention relates to the manufacture of hydrogen sulfid.

The object of the invention is to provide a process which is simple, inexpensive, and efficient for manufacturing hydrogen sulfid.

A further object of the invention is to provide a process of the nature referred to for manufacturing hydrogen sulfid from sulfur and fuel gas.

Other objects of the invention will appear more fully hereinafter.

The invention consists substantially in the mode of operation hereinafter set forth and finally pointed out in the claims.

In the accompanying drawing I have shown an apparatus suitable for use in carrying out my invention.

In many branches of the chemical industry, and particularly in processes relating to the removal of sulfur dioxide in the form of sulfur from the smoke and other products of combustion, of metallurgical furnaces, smelters, and the like, large quantities of hydrogen sulfid are required, and therefore it is important to provide a method or process by which hydrogen sulfid gas can be produced cheaply on a large scale. It is among the special purposes of my present invention to provide a process which answers the requirements.

The process of my invention consists essentially in heating fuel gas with sulfur and treating the resultant gaseous mixture to transform an objectionable compound thereby formed into hydrogen sulfid, thus obtaining a final product consisting solely of hydrogen sulfid with perhaps other inert components.

The fuel gas employed in carrying out my invention includes any gas or gaseous mixture employed as a fuel, for example, water gas, Mond-gas, and the like. The combustible components of such fuel gas ordinarily are hydrogen, carbon monoxid, and hydrocarbons. One or more of these components of fuel gas may predominate or may be present in very small relative proportions. Fuel gas contains other components also such as nitrogen, aqueous vapor, and carbon dioxid. The nitrogen and aqueous vapor are quite inert in the chemical changes involved in my process of manufacturing hydrogen sulfid, and therefore their presence may be disregarded in the carrying out of the process of my invention. When fuel gas is heated with sulfur vapor the following changes take place:

*a.* The hydrogen combines with the sulfur to form hydrogen sulfid.

*b.* The carbon monoxid combines with the sulfur and yields carbon oxysulfid.

*c.* The hydrocarbons heated with sulfur vapor yield their hydrogen and form hydrogen sulfid.

*d.* The carbon dioxid heated with sulfur vapor produces carbon oxysulfid and sulfur dioxid, according to the following equation

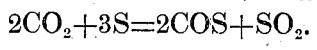
$$2CO_2 + 3S = 2COS + SO_2.$$

But as hydrogen sulfid will also be present in the reacting mixture it reacts with sulfur dioxid to form sulfur and water according to the following equation

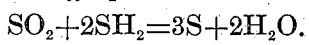
$$SO_2 + 2SH_2 = 3S + 2H_2O.$$

When the fuel gas employed contains a large relative proportion of carbon dioxid and a small relative proportion of hydrogen, I deem it best to add a gas containing hydrogen so that at least a sufficient amount of hydrogen sulfid is produced to accomplish the foregoing reaction. Any hydrogen containing gas will answer this purpose such as water gas. The net result of the presence of carbon dioxid in the fuel gas, where a sufficient amount of hydrogen is employed, is the production of carbon oxysulfid and aqueous vapor. The above reactions *a*, *b*, *c*, *d*, take place almost completely provided the temperature is not too high, preferably below 900° C. The reversibility of these reactions remains within very small limits. If the temperature should be increased to a too high degree, as for example, 1400° C., the reversal of the reactions becomes too large. In practice probably the limits of temperature for attaining the best results are 600° C. to 800° C.

From the foregoing it is quite clear that by heating fuel gas with sulfur vapor at an appropriate temperature a gaseous mixture is produced which contains hydrogen sulfid and carbon oxysulfid together with nitrogen and aqueous vapor. The proportion of hydrogen sulfid and carbon oxysulfid will vary greatly according to the relative amounts of hydrogen, carbon monoxid, hydrocarbons and carbon dioxid present initially in the fuel gas employed.

The reactions above described may be carried out in any suitable and adequately equipped apparatus.

In the accompanying drawing I have shown somewhat diagrammatically one form of apparatus which is suitable for the purpose, but obviously my invention in its broadest scope is not to be confined or limited to the use of any specific construction or arrangement of apparatus. In the particular arrangement shown as illustrative of an apparatus suitable for carrying out my process a chamber B is filled for the greater part of its capacity with suitable material capable of presenting a large surface area, and which is resistant to heat to a desired degree of temperature, that is, to the degree of heat required in carrying out my process. This material M may be perforated or porous bricks, which may be covered with cuprous sulfid, or some other metallic sulfid, or this material may be pumice or even copper wire gauze. It is not necessary to employ the cuprous sulfid to start the operation. When the bricks or other materials are impregnated with a copper salt, and heated with sulfur vapor and fuel gas, they soon become covered with a coating of cuprous sulfid. The cuprous sulfid as well as other metallic sulfids perform the function of a catalyzer to accelerate the reactions between the components of the fuel gas and the sulfur vapor. Initially and in order to start the reactions the furnace chamber B must be heated. This can be accomplished by allowing the fuel gas mixed with air to burn within the chamber, or by sending a current of heated gas through the chamber. The reaction which takes place between the fuel gas and the sulfur vapor produces in itself a large amount of heat. It is therefore unnecessary to employ extraneous heat in order to maintain the furnace chamber at the temperature necessary for the required velocity or speed of reaction. On the contrary as the reaction proceeds it becomes necessary to provide for a desirable degree of cooling in order to prevent the furnace chamber from becoming too hot. As above stated the best temperature for the reaction lies between 600° C. and 800° C., but these limits may be somewhat exceeded up or down without injury.

The fuel gas is supplied to the furnace chamber through the inlet connection indicated at N. Sulfur in molten condition is permitted to flow into the furnace chamber B through connections indicated at C and D, preferably into the lower part of the chamber B. Within the chamber B the sulfur evaporates rapidly and mixes with the fuel gas. The products of the reactions which take place within the chamber B, together with the sulfur vapor, pass from the chamber B through the outlet connection indicated at E at the upper part of the furnace chamber and through the cooling pipes F where the gaseous mixture cools down to a degree sufficient to cause the sulfur to condense into a liquid which collects at the lower part of the cooling pipe or coils F as indicated at G, whence it again returns into the furnace chamber through connection D and is used over again for again mixing with the fuel gas. Care should be taken to provide a considerable excess of sulfur vapor in the furnace chamber in order to insure completeness and speed of reactions. In the manner described, and as a final product from the furnace chamber, there is secured a mixture of hydrogen sulfid, carbon oxysulfid, aqueous vapor, and nitrogen. Of these gases carbon oxysulfid is an objectionable component for the reason that its reaction with other substances is generally very slow as compared with that of hydrogen sulfid. Consequently the carbon oxysulfid is apt to escape unchanged into the air. This means, of course, appreciable loss in the sulfur it contains and which might otherwise be recovered and utilized in the industries. It also means contamination of the air with sulfur compounds which is deleterious and therefore highly objectionable.

Now carbon oxysulfid reacts with water to form hydrogen sulfid and carbon dioxid according to the following equation $$COS + H_2O = H_2S + CO_2.$$

This reaction, however, is so slow that it cannot by itself be utilized to advantage in the commercial production of hydrogen sulfid. It is therefore necessary to employ a catalyzer in order to accelerate the reaction. For this purpose an alkaline solution is employed, and this is accomplished in the following manner.

The gaseous mixture delivered from the furnace chamber through the pipes or coil F is passed through a series of pipes or coils H in order to still further reduce the temperature thereof, and thence into a pump or compressor indicated at I, which receives the gaseous mixture and delivers it under pressure into an agitating chamber indicated at J. In this chamber is introduced an alkaline solution through which the mixed gaseous mixture is forced by the pump while at the same time the alkaline solution is vigorously agitated in any suitable or convenient manner, as for instance, by revolving blades L and intervening baffles N, or otherwise. In this agitating chamber the reaction above mentioned is completed and the gaseous mixture, now containing hydrogen sulfid, carbon dioxid, aqueous vapor, and nitrogen, passes through the delivery connection indicated at K to a gas holder or collector or to the place where it is desired to utilize the hydrogen sulfid. As above stated the presence in this final gaseous product of carbon dioxid, aqueous vapor, and nitrogen may be disregarded so far as the utilization of the hydrogen sulfid is concerned, since these constituents are inert and do not interfere with the utilization of the hydrogen sulfid.

Any desired or suitable alkaline solution may be employed. I deem the alkali best suited for the purpose to be magnesium hydroxid which may be used in the form of fine suspension in water. Magnesium hydroxid is slightly soluble in water, imparting to the solution a distinctly alkaline reaction. However, it reacts with hydrogen sulfid to form magnesium hydrosulfid which is readily soluble in water. At the somewhat raised temperature the magnesium hydrosulfid becomes unstable in the aqueous solution and magnesium hydroxid is regenerated with evolution of hydrogen sulfid. The instability of magnesium hydrosulfid in aqueous solution at a raised temperature renders magnesium hydroxid one of the best catalyzers for the hydrolysis of carbon oxysulfid. It is best to maintain the temperature of the agitating chamber at 70° C. to 90° C. but these limits may be somewhat exceeded either up or down without harm. The carbon dioxid forming part of the gaseous mixture introduced into the agitating chamber is absorbed to a certain extent by magnesium hydroxid. This absorption, however, is very imperfect and consequently the magnesium hydroxid retains its catalytic characteristic and activity almost indefinitely. Suitable alkalis such as caustic potash, caustic soda, or the like, may be used instead of magnesium hydroxid. The caustic alkalis absorb both hydrogen sulfid and carbon dioxid and produce hydrosulfids and carbonates. But these compounds hydrolyze in water and the solution remains always alkaline. This is necessary for accelerating the hydrolysis of carbon oxysulfid.

Having now set forth the objects and nature of my invention, and the manner of carrying the same into practical operation, what I claim as new and useful, and of my own invention, and desire to secure by Letters Patent of the United States, is,—

1. The process of manufacturing hydrogen sulfid which consists in causing a reaction of fuel gas and sulfur in the presence of a catalyzer.

2. The process of manufacturing hydrogen sulfid which consists in causing a reaction between fuel gas and sulfur in the presence of metallic sulfid.

3. The process of manufacturing hydrogen sulfid which consists in causing a reaction between fuel gas and sulfur in the presence of cuprous sulfid.

4. The process which consists in causing a reaction between fuel gas and sulfur and then condensing the sulfur content out of the gaseous mixture produced by such reaction.

5. The process which consists in causing a reaction between fuel gas and sulfur and then treating the gaseous products of the reaction with an alkaline solution.

6. The process which consists in causing a reaction between fuel gas and sulfur and then treating the gaseous products of the reaction with magnesium hydroxid.

In testimony whereof I have hereunto set my hand on this 31st day of October A. D., 1917.

KIKUNAË IKEDA.